United States Patent [19]

King et al.

[11] Patent Number: 5,408,918

[45] Date of Patent: Apr. 25, 1995

[54] TEA BREWER

[75] Inventors: Brian L. King, Palo Alto, Calif.; Paul A. King, Montreal, Canada

[73] Assignee: VKI Technologies, Inc., Saint-Hubert, Canada

[21] Appl. No.: 231,512

[22] Filed: Apr. 22, 1994

[51] Int. Cl.[6] ............................................. A47J 31/32
[52] U.S. Cl. .................... 99/289 R; 99/290; 99/291
[58] Field of Search ............... 99/289 R, 290, 289 T, 99/289 P, 295, 287, 286, 323.1, 279, 291, 302 P; 426/433

[56] References Cited

U.S. PATENT DOCUMENTS

| | | | |
|---|---|---|---|
| 3,496,861 | 2/1970 | Stahler | 99/289 R |
| 3,552,976 | 1/1971 | King | 99/289 R |
| 3,561,641 | 2/1971 | King | 99/289 R |
| 4,193,321 | 3/1980 | King | . |
| 4,305,328 | 12/1981 | Kueser | 99/295 |
| 4,632,023 | 12/1986 | King | 99/289 T |
| 4,694,739 | 9/1987 | Daintrey | 99/302 P |
| 4,709,625 | 12/1987 | Layre | 99/289 R |
| 4,784,050 | 11/1988 | Cavalli | 99/302 P |
| 4,791,859 | 12/1988 | King | 99/289 T |
| 4,903,586 | 2/1990 | King | 99/287 |

Primary Examiner—Robert W. Jenkins
Attorney, Agent, or Firm—Hill, Steadman & Simpson

[57] ABSTRACT

An improved tea brewer which can be attached to a coffee brewer and has a tea wiper that connects to the coffee wiper for removing tea leaves from the machine.

5 Claims, 2 Drawing Sheets

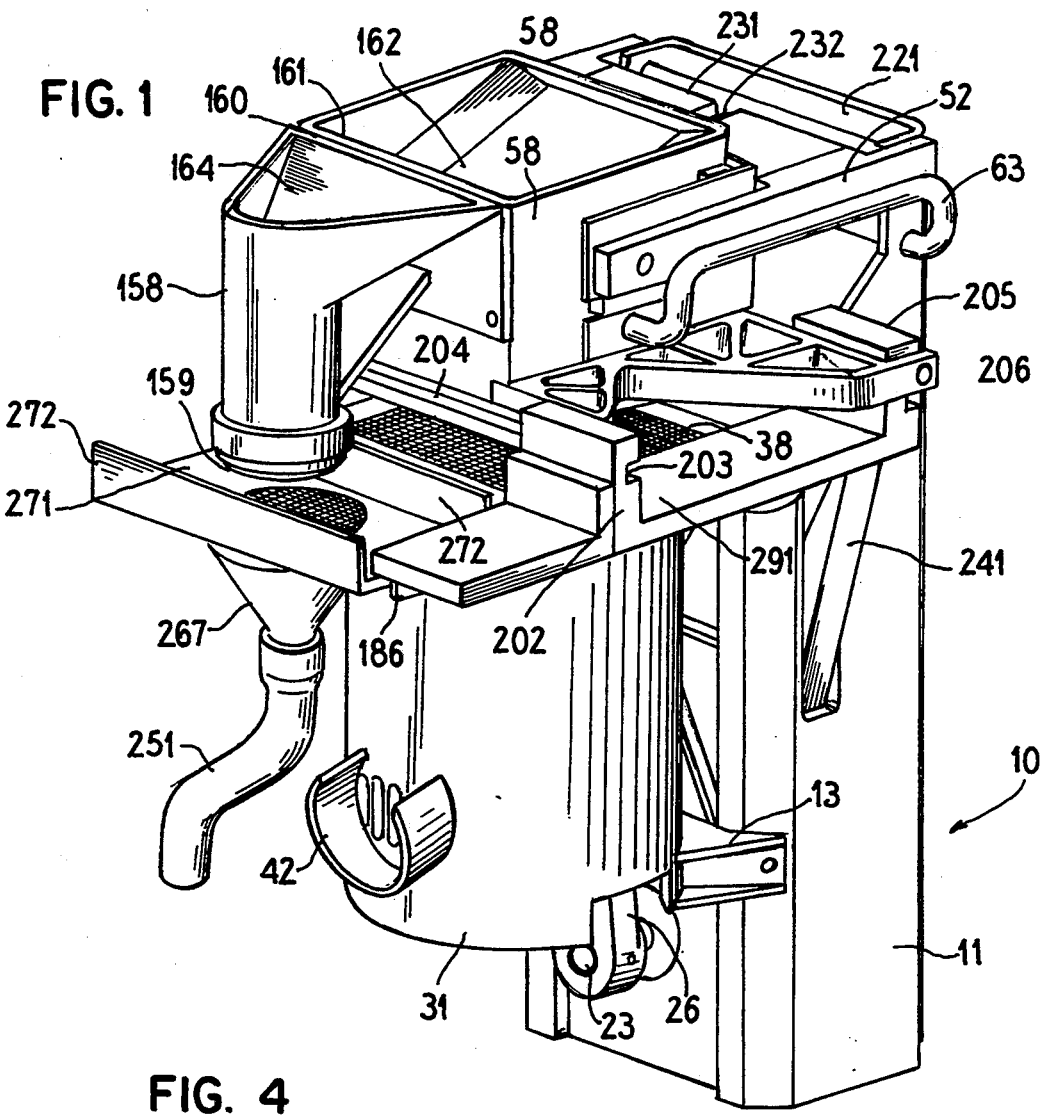
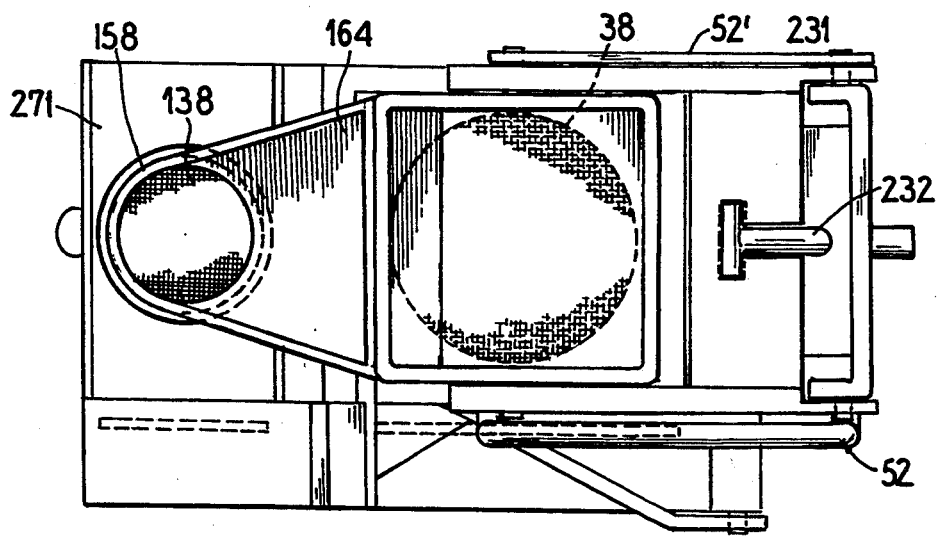

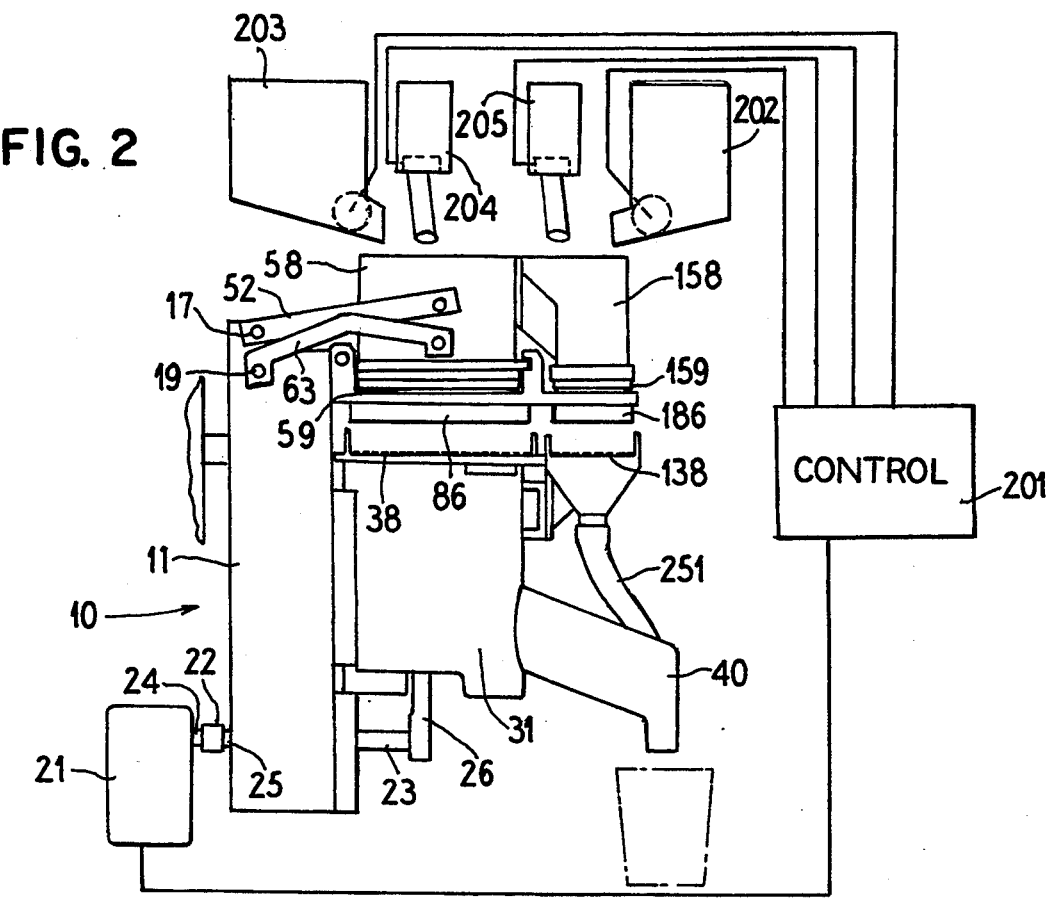
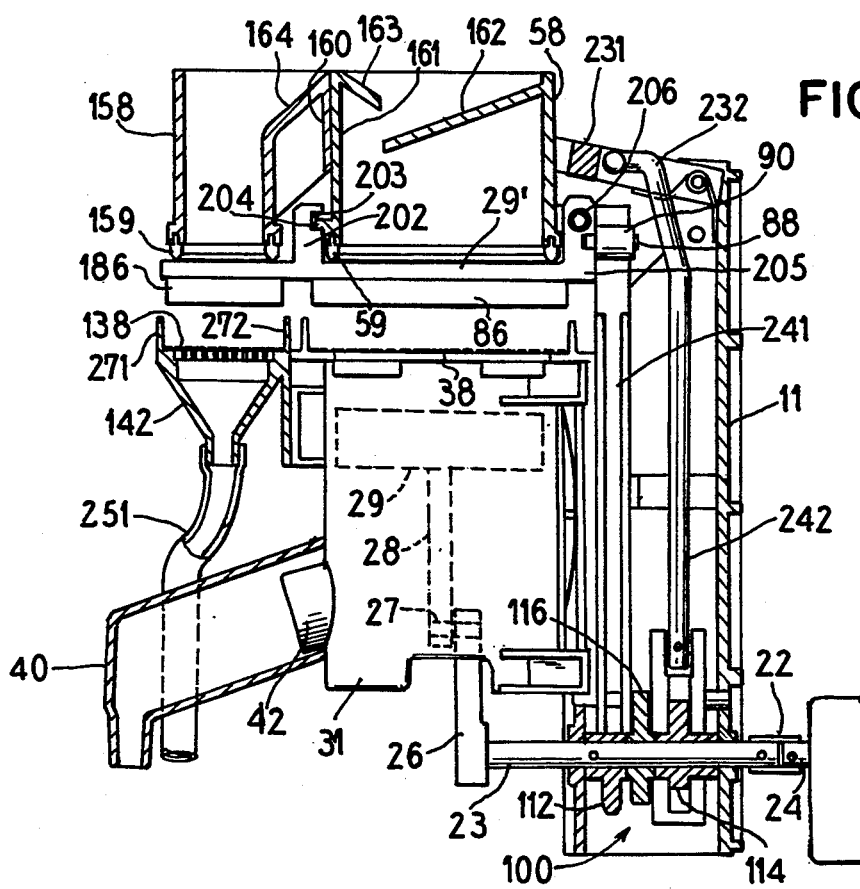

TEA BREWER

CROSS REFERENCE TO RELATED APPLICATIONS

This application is related to co-pending application Ser. No. 07/938,768 filed Sep. 1, 1992 entitled "Coffee Brewer Method and Apparatus", now U.S. Pat. No. 5,351,604, in which Brian L. King and Paul A. King are the inventors and to application Ser. No. 141,733 filed Oct. 27, 1993, now U.S. Pat. No. 5,349,897, in which Brian L. King and Paul A. King are the inventors entitled "Coffee Brewer Method and Apparatus".

BACKGROUND OF THE INVENTION

1. Field of the Invention

This invention relates in general to method and apparatus which produces coffee, tea and other beverages during a single cycle. This invention is an improvement of coffee brewing machines which allows a simple low cost tea brewer to be added to a single cycleable coffee brewer.

2. Description of Related Art

The present invention allows a single cycle coffee brewer to be upgraded so that it can also brew tea. The present invention can be attached to and form an improvement in the machines of application Ser. No. 938,768 and to Ser. No. 141,733 referenced above.

The present invention also can be applied to other coffee brewers that use a wiper to remove the spent coffee grounds.

It is an object of the present invention to brew tea in a machine which also has a mechanism which brews coffee in a single cycle and to do so at a very low cost.

It is an object of the present invention to keep the coffee grounds and tea leaves completely separate during the brewing cycles and that the surfaces which contact tea do not come in contact with coffee and vice-versa so that the taste of each beverage is not compromised.

It is an object of the present invention to provide a tea brewer to be attached to an existing coffee brewer. A wiper for removing tea leaves is attachable to a coffee wiper and can be driven by the same driving mechanism so that the invention is a simplified coffee or tea brewer mechanism.

Other objects, features and advantages of the invention will become apparent from the following description and claims when read in view of the drawings in which:

BRIEF DESCRIPTION OF THE DRAWINGS

FIG. 1 is a perspective view illustrating the tea brewing apparatus when attached to a brewer such as described in application Ser. No. 938,768 and Ser. No. 141,733.

FIG. 2 is a side plan view of the invention.

FIG. 3 is a sectional view of the invention; and

FIG. 4 is a top plan view illustrating the coffee and tea strainers.

DETAILED DESCRIPTION OF THE PREFERRED EMBODIMENTS

The figures show a coffee brewer such as shown and described in application Ser. No. 938,768 and Ser. No. 141,733 which comprises an upper brewing chamber 58 and a lower brewing chamber 31. The upper brewing chamber 58 is sealed during coffee brewing by a gasket 59 to a lower brewing chamber 31 and a coffee filter 38 is mounted between them during brewing such that hot water from a reservoir 204 and coffee from a container 203 are supplied into the upper brewing chamber 58 by a control 201. The lower brewing chamber 31 includes a piston 29 which has a piston rod 28 which is connected by pivot pin 27 to a crank arm 26 mounted on the output shaft 23 which is connected by a coupling 22 to the output shaft 24 of the motor 21. The shaft 23 carries a cam 114 which engages a rod 242 for raising and lowering and holding at an intermediate position the upper chamber 58 as described in detail in application Ser. No. 141,733 and application Ser. No. 938,768. The shaft 23 also carries a pair of cams 112 and 116 which actuate the coffee grounds wiping mechanism 86 as described in application Ser. No. 938,768 and Ser. No. 141,733. This mechanism includes a pair of arms such as 241 which engage a roller 90 to move the wiper 86. As shown in FIG. 2 the lower brewing chamber 31 and the upper brewing chamber 31 are supported by a frame member 11 of the machine 10 and the upper brewing chamber is supported by arms 52 and 63 mounted on pivot pins 17 and 19, respectively. The upper end 232 of shaft 242 is connected to a cross member 231 as shown in FIGS. 3 and 4 which engages pivot members 52 on either side of the upper chamber 58 so as to control its vertical position. As is described in detail in application Ser. No. 938,768 and Ser. No. 141,733 the upper chamber 58 has at least three positions, one when it is in the coffee brewing position with the gasket 59 sealing the upper chamber 58 to the lower chamber 31; a second raised position wherein the coffee wiper 86 which is carried on the bottom of the upper chamber 58 is above the coffee grounds on the filter 38 such that when the actuating arms 241 and a second arm not shown, but described in detail in application Ser. No. 938,768 moves the wiper 86 in a first direction it does not engage the coffee grounds. The arm 242 also moves the upper chamber 58 to a third position wherein the wiper 86 engages the coffee grounds on the filter 38 as the wiper 86 is moved back across the filter by the arms 241.

The improvement of the present invention comprises an upper tea brewing chamber 158 which has a sidewall 160 that is connected by suitable holding means to the front vertical wall 161 of the upper brewing chamber 58 as shown in FIGS. 1, 2 and 3. The control 201 is connected to the hot water container 205 which discharges hot water into the funnel of the tea brewer 164 and simultaneously tea leaves are discharged from a container 202 into the tea brewer 158. The lower end of the upper chamber 158 of the tea brewer is provided with a gasket 159 which seals with a lower tea funnel 142 when in the tea brewing position. A tea leaf filter 138 is mounted over the upper end of the lower tea brewing chamber 142 and upwardly extending ledges 271 and 272 are mounted adjacent the filter 138. A discharge tube 251 connects from the lower end of the lower chamber 142 and discharges tea into a suitable cup.

A tea wiper 186 is connected to slide member 291 which carries the coffee wiper 86 and the member 291 is formed with upwardly extending members 202 and 205 which are formed with grooves such as groove 203 in which are received rails 204 on the upper brewing chamber 58 to allow the wipers 86 and 186 to move back and forth.

When coffee is made with a machine it operates in the same manner as described in application Ser. No.

938,768 and Ser. No. 141,733. Tea can be selected for brewing rather than coffee. Since the tea brewer upper chamber 158 is attached to the upper chamber 58 of the coffee brewer when tea is to be brewed water and tea will be supplied into the upper end 164 by the water and tea supply 205 and 202 and the hot water will pass through the tea and the filter 138 since they are sealed together and into the lower brewing chamber 267 and out the tube 251 to the tea cup, not shown. After the brewing cycle has been completed the motor 21 will rotate the cam 114 so that the arm 242 lifts the upper brewing chamber 58 and the upper tea brewing chamber 158 to the position shown in FIG. 3 and the cams 116 and 112 will cause the arms 241 to move the wipers 86 and 186 to one end of their travel above the filters 38 and 138. Subsequently, the arm 242 will lower the upper brewing chambers 58 and 158 so that the wipers 86 and 186 engage the filters 38 and 138 and the arms 241 will then move the wipers 86 and 186 so as to wipe tea or coffee from the filters 138 and 38, respectively. Thus by merely attaching a tea brewer to the coffee brewer of co-pending applications Ser. No. 938,768 and Ser. No. 141,733 tea will be brewed and the tea leaves will be removed from the filter 138.

It is to be realized that all of the disclosure of copending applications Ser. No. 938,768 and Ser. No. 141,733 is hereby incorporated by reference.

Although the invention has been described with respect to preferred embodiments it is not to be so limited as changes and modifications can be made therein which are within the full scope of the appended claims.

We claim:

1. A tea brewer which is attachable to a coffee brewer having an upper coffee brewing chamber and a lower coffee brewing chamber and a movable coffee wiper for removing coffee grounds from a coffee filter between said upper and lower coffee brewing chambers comprising an upper tea brewing chamber attached to said upper coffee brewing chamber and movable therewith a lower tea brewing chamber attached to said lower coffee brewing chamber, a tea leaf filter attached to the top of said lower tea brewing chamber, and a tea leaf wiper attached to said coffee wiper and movable therewith for removing tea leaves from said tea leaf filter.

2. A tea brewer according to claim 1 including driving means for moving said upper coffee brewing chamber and said upper tea brewing chamber to at least three vertical positions during a brewing cycle.

3. A tea brewer according to claim 2 including driving means for moving said coffee wiper and said tea leaf wiper across said coffee filter and said tea lead filter to clean them.

4. A tea brewer according to claim 3 wherein during an initial brewing time said upper and lower tea brewing chambers are sealed together after which said upper and lower tea brewing chambers are separated so that said tea leaf wiper can pass over and remove tea leaves from said tea leaf filter.

5. A tea brewer according to claim 1 including means for supplying hot water and tea into said upper tea brewing chamber.

* * * * *